United States Patent [19]

Perry et al.

[11] Patent Number: 5,119,501
[45] Date of Patent: Jun. 2, 1992

[54] ADAPTIVE DIVERSITY EQUIPMENT ARRANGEMENT FOR CELLULAR MOBILE TELEPHONE SYSTEMS

[75] Inventors: Fred G. Perry; Roderick J. Passmore, both of Lynchburg, Va.

[73] Assignee: Ericsson GE Mobile Communications, Inc., Lynchburg, Va.

[21] Appl. No.: 511,348

[22] Filed: Apr. 19, 1990

[51] Int. Cl.⁵ .......................................... H04M 11/00
[52] U.S. Cl. ..................................... 455/33.3; 455/134
[58] Field of Search .................. 455/33, 56, 69, 134, 455/52, 133, 136, 277; 379/60, 62, 59, 63

[56] References Cited

U.S. PATENT DOCUMENTS 4,726,050  2/1988  Menich et al. ........................ 455/33
4,797,947  1/1989  Labedz ................................. 455/33
4,823,398  4/1989  Hashimoto ........................... 455/134
4,881,082  11/1989  Graziano ............................. 455/33

Primary Examiner—Curtis Kuntz
Attorney, Agent, or Firm—Nixon & Vanderhye

[57] ABSTRACT

A method and apparatus utilizing adaptive diversity in the base station of a cellular telephone system where during a diversity period the signal strengths of two receivers assigned to three or more sectors are continuously compared and the stronger audio output signal is switched to be used in the station signal processing circuits and where during non-diversity, relatively short time periods, samples of adjacent sectors signal strengths are measured and compared so that the adjacent sector with the strongest signal is applied to one receiver while the other receiver supplies the central sector to the other receiver for transmission to the station audio processor.

18 Claims, 4 Drawing Sheets

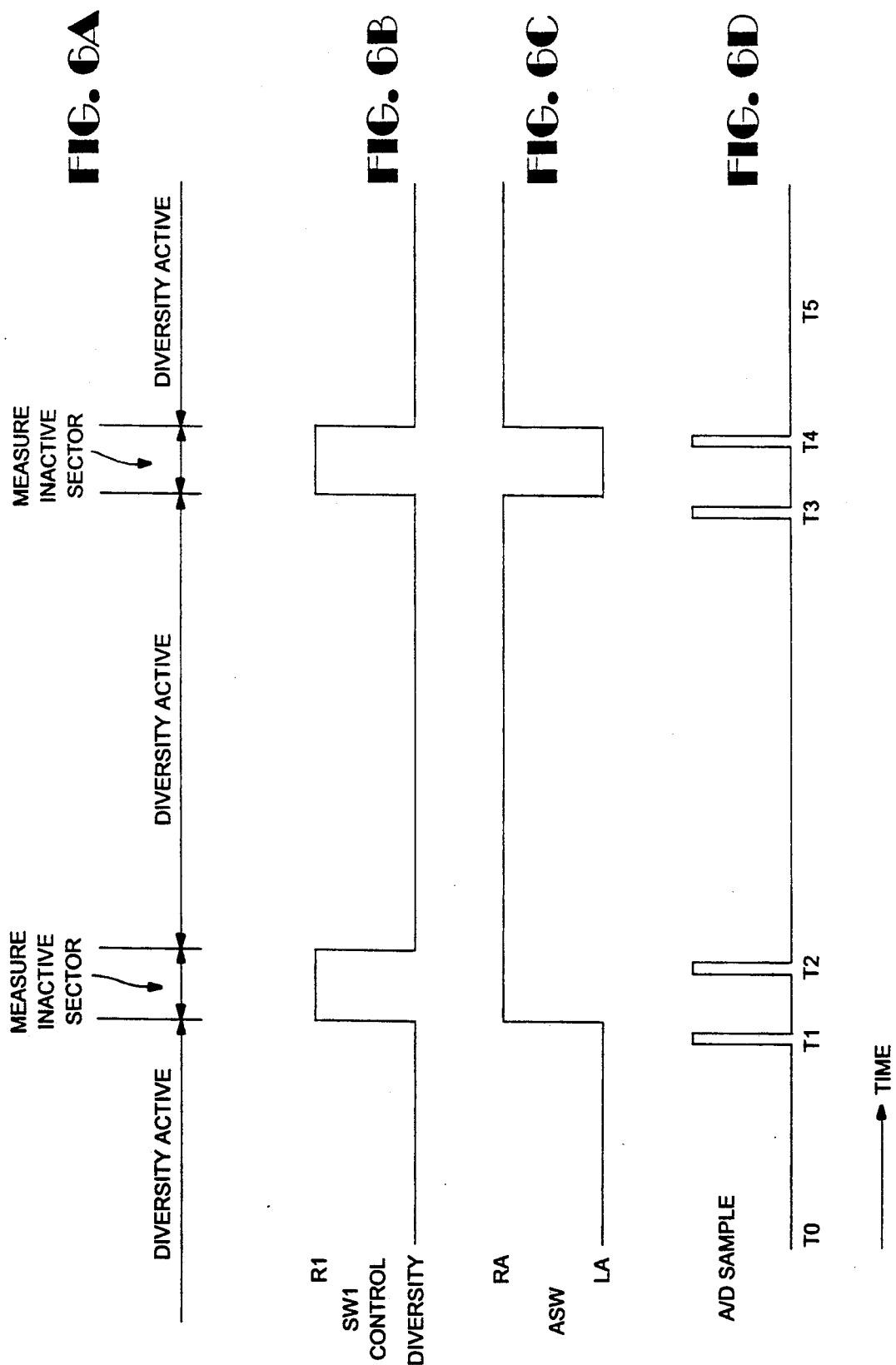

ADAPTIVE DIVERSITY EQUIPMENT ARRANGEMENT FOR CELLULAR MOBILE TELEPHONE SYSTEMS

FIELD OF THE INVENTION

The invention relates to improvements in cellular telephone base stations.

BACKGROUND AND SUMMARY OF THE INVENTION

Contemporary cellular mobile telephone systems conventionally include a "diversity" system of some nature in the base or fixed station receivers to reduce the effects of multipath fading wherein large rapid fluctuations of signal level occur. In such diversity systems the signals received by two or more antennas are normally made available to the receiving equipment and a process or scheme is provided whereby when the signal from one antenna is experiencing a large negative fluctuation or deep fade the signal from another antenna may be substituted. Such switching thus produces a signal level of higher average signal strength, and the quality of communications is inherently improved.

A typical such diversity system associated with receiving equipment is illustrated in FIG. 1 which is a simplified block diagram illustrating a single channel. In a typical such system each antenna conventionally may serve many channels through a multicoupler. Although such multicouplers are not illustrated in subsequent figures, the exemplary embodiments found therein may be assumed to include such multicouplers. As illustrated in FIG. 1, such systems are provided with two receivers per RF channel, and each receiver has an antenna input and audio output as well as a received signal strength indicator (RSSI) output. The latter output is an analog output which is indicative of or provides a measure of the received RF signal strength at the antenna input. A comparison of the RSSI receiver outputs is made to determine the larger of the two, and the generated high or low signal may be used to operate a switch such as SW1 so as to select the input for the audio processing element from the receiver with the highest RSSI signal. Such a diversity scheme is known as a "post-detection receiver selection by RSSI" and is in common use.

It is also known to use the RSSI or "received signal strength indicator" for other purposes such as determining when it is necessary to hand off or transfer the communications function to another cell. Such a determination may be made by converting the RSSI measure to a digital format for transmission to a central processor for comparison with similar signals from other cells so that the cell having the strongest signal from the mobile unit may be determined. The RSSI signals may be used for these and other purposes through the use of a sampling switch means (SW2), an analog-to-digital converter and the logic unit as illustrated in FIG. 1.

Diversity circuits where the instantaneously larger of the input signals is passed to the receiver, operate with sufficient speed to follow the rather large and rapid fluctuations of the received signal strength that are present due to multipath fading. Determining when to transfer or hand off the communications function to another cell, however, is not dependent on rapid fluctuations but is dependent on the mobile position and average signal strength. Accordingly, both instantaneous and average signal strengths must be determined.

As seen in FIG. 1 two receivers and two antennas are required for each area to be covered. However, in areas where the number of subscribers is quite high it is necessary to provide smaller cells and re-use frequencies in cells that are relatively close to each other in order to provide a sufficiently high number of channels to handle the communication traffic. In such areas it is conventional to subdivide cells into sectors and use directional antennas to reduce interfering signals from other cells. Each sector would require two antennas and two receivers for maintaining diversity as noted above. Where a cell, for example, is divided into three 120° sectors, six receiving antennas would be required. When the cell is further divided, maintaining diversity would lead to a prohibitively large number of antennas and overcrowding of support towers and the like. Clearly, under such circumstances it would be desirable to provide the benefits of diversity but with fewer antennas being required in each sector of a cell.

We have discovered that effective diversity with only one receiver antenna in each sector of a sectored cell may be obtained through the use of "adaptive" diversity. Such diversity dynamically adapts to changing signal conditions wherein an analog comparator accepts RSSI signals from two receivers and the receivers operate to receive the signals from three sectors of a sectored cell; one receiver being connected to the center sector antenna and the other receiver being switchably connected between left and right adjacent sector antennas. Effective diversity is maintained (for a large portion of the time) between the center sector and one of the adjacent sectors. For very short periods of time the audio is taken from the center sector only while the second receiver measures RSSI in the other adjacent sector. By keeping track of average signal levels in both adjacent sectors we can adaptively determine which adjacent sector has the largest average signal and use it during the large time period when diversity is in effect.

Such adaptive diversity method and apparatus not only maintains diversity where large rapid fluctuations of signal level occur but also dynamically adapts to changing conditions due to movement of the mobile unit. Thus, the shortcomings of the prior art are overcome.

These and further objects and advantages of the present invention will become more apparent upon reference to the following specification, appended claims and drawings.

BRIEF DESCRIPTION OF THE DRAWINGS

FIGS. 6A to 6D show portions of a timing diagram of the methodology followed by the exemplary structure of FIG. 5.

DETAILED DESCRIPTION OF THE DRAWINGS

Figure 2:
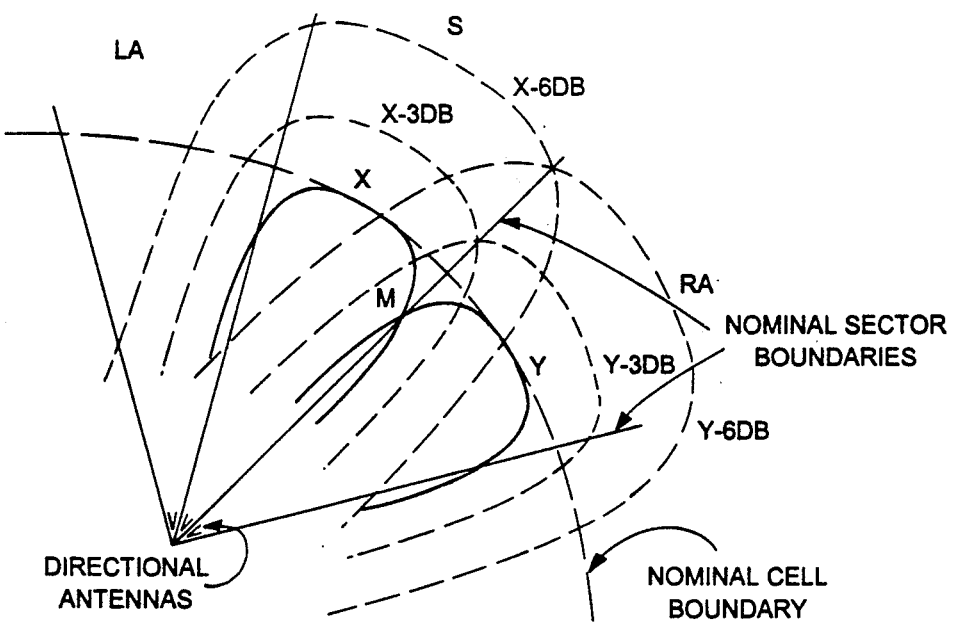
FIG. 2 shows part of a cell which has been divided into a number of sectors with each sector including a directional antenna.

As illustrated in FIG. 2, a cell may be divided into a number of sectors with each sector including a directional antenna. Idealized signal level contours of equal signal level for two of the sectors labelled S and RA are also illustrated. Such contours show that although the maximum signal will normally be obtained by an antenna from a mobile located within the boundaries of the sector containing the antenna, signals of only a little less amplitude can be obtained by an antenna located in another sector. Similar antenna propagation patterns, although not illustrated, also apply to the left adjacent sector LA.

As illustrated in FIG. 2, a particular mobile is located in sector S at the point M, and it is clear that the antenna in sector S will be receiving the mobile signal at some average level. The antenna in sector RA (right side adjacent sector) will also be receiving the mobile signal but a reduced average level. Depending on the location of the mobile the average signal level received at RA will range from nearly equal to that detected by the antenna in sector S to a few dB lower than the signal received at S. The former situation would occur, for example, when the mobile was on the sector border; whereas, the latter would occur with the mobile in the center of sector S.

Under such circumstances if multipath fading phenomena occurred in sector S (fading in the range of 20 to 30 dB), the signal from RA for the duration of the fade may be on the order of 10 or 20 dB stronger. Similar signal levels and conditions may be found in the left adjacent sector LA when the mobile is on that side of sector S.

Clearly, by using the signals from the sectors adjacent the S sector, effective diversity may be provided with only one receiving antenna in each sector. Additionally, it is clear that if the average signal level in an adjacent sector such as RA becomes larger than the average signal in sector S, the conditions are such that a transfer to the former sector, i.e. a handoff, would be appropriate since the mobile is no longer truly within sector S.

Figure 1:
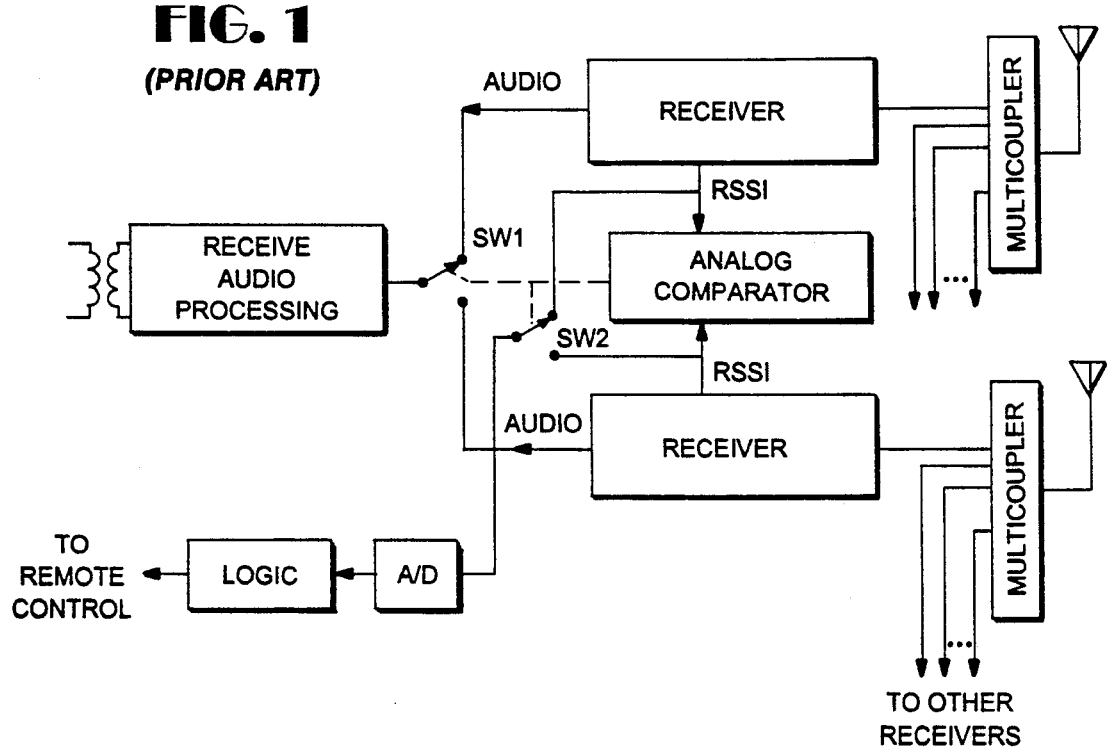
FIG. 1 is a diagram of a prior art base station including a diversity system whereby the strongest of the two audio signals received by two antennas is used to maintain a higher average signal level.
Figure 3:
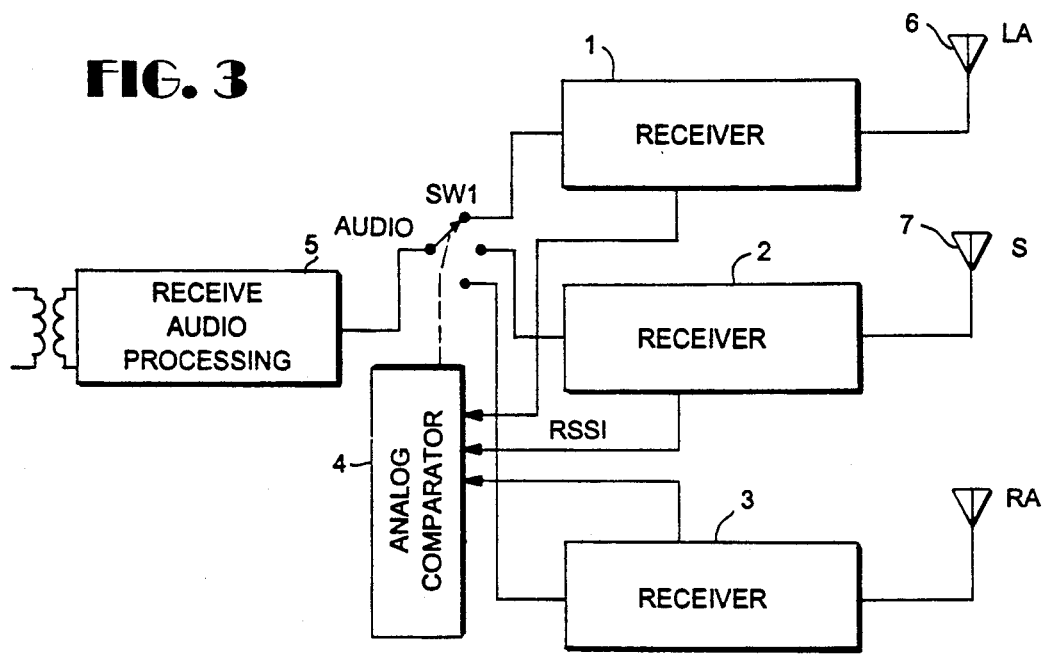
FIG. 3 illustrates a manner in which adjacent sector diversity may be obtained using three directional antennas and three receivers.

Apparatus for obtaining such diversity and handoff transfers is illustrated in FIG. 3 which differs from that which is shown in FIG. 1 in that three receivers 1, 2 and 3 are provided with three RSSI branch paths being compared by element 4 where the latter element operates as a three pole switching arrangement for feeding the strongest audio signal to the base station audio processing system 5. That is to say, if the strongest instantaneous signal is received by sector S antenna 7, switch SW1 connects receiver 2 of sector S to element 5. With multipath propagation fading phenomena present in sector S, either sector RA or sector LA would furnish the audio input to element 5 depending on which sector had the strongest signal.

Figure 4:
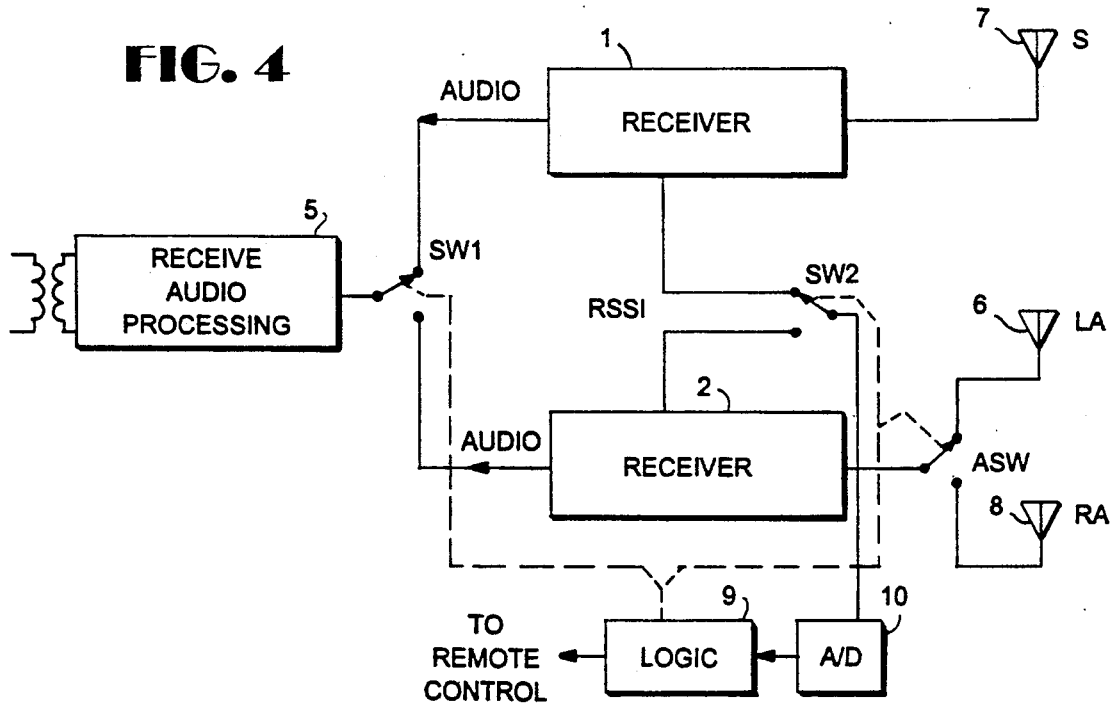
FIG. 4 shows an attempt to provide adjacent sector diversity with only two receivers and three antennas.

Although such a system is clearly operable, it has the disadvantage of the additional expense incurred by requiring a third receiver. As illustrated in FIG. 4, a two-receiver system for providing adjacent sector diversity is obtainable by connecting the adjacent sector antennas 6 and 8 to the second receiver and controlling the illustrated switch positions through the use of digital logic 9. The dotted lines indicate one or more switch control signals which allow the logic circuits to exercise control over the switches. Switch SW2 allows the analog-to-digital converter to measure RSSI samples from either receiver. The antenna switch ASW allows receiver 2 to be connected to either of the adjacent sector antennas (6 and 8). Under initial conditions the audio is, as illustrated, connected from receiver 1 by way of SW1 to audio processor 5. Additionally, the RSSI signal from receiver 1 is connected to converter 10 by way of SW2. Logic 9 would measure the received signal strength indicator (RSSI) of sector S and thereafter the logic would connect converter 10 to receiver 2 and make similar measurements in each of the adjacent sectors in a sequential manner.

A comparison of the measurements by the logic element would indicate the highest signal strength and set the switches appropriately. If the RSSI in sector S, for example, were the largest measured, the audio switching would be as illustrated in the figure. Thereafter, the measurement cycle would be repeated and an adjacent sector such as LA or RA would be connected for providing the audio input to element 5 if it provided the strongest signal as indicated in the subsequent measurements. Logic unit 9 operates the antenna switch in a fashion similar to SW1. That is to say, in each measurement cycle the adjacent sector having the largest measured RSSI would be connected to receiver 2 and would be changed only if a subsequent measurement indicated that the other adjacent sector RSSI were stronger.

Although such a system requires only two receivers, the analog comparator has been replaced by a sequential digital RSSI measurement routine wherein the receiver whose audio output is not being transmitted to element 5 is being used to measure signal strength in the adjacent sectors. Although this process is workable in principle as to providing audio improvement due to diversity switching, practical implementation presents a problem since the measurements are no longer being made in a simultaneous manner. That is to say, significant fades in the sector signals may occur many times a second and last for only a few milliseconds. In order for diversity to provide improved signal quality substantially instantaneous switching is required when multipath fading is sensed. To obtain such instantaneous switching, the entire process of switching antennas, acquiring and evaluating new RSSI measurements and switching the appropriate audio output signal to processor 5 must be completed in no more than a couple of microseconds in order for diversity to be effective. Such high performance sequential circuit designs are difficult to obtain and expensive. Accordingly, such circuit designs would not be well suited for obtaining competitive commercial products.

Figure 5:
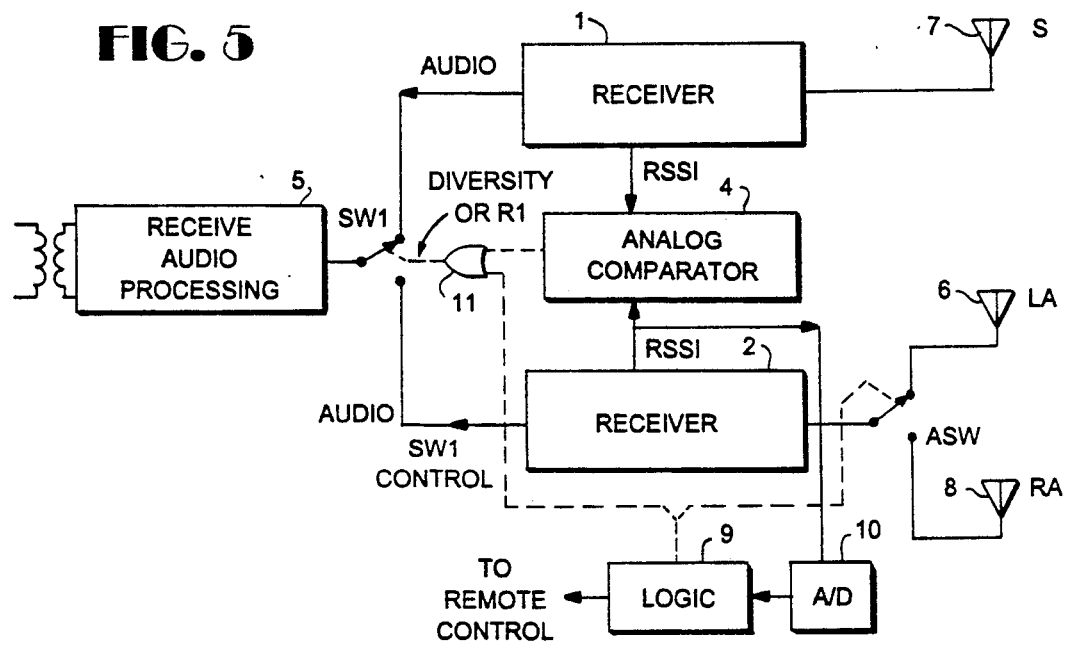
FIG. 5 illustrates the preferred exemplary embodiment for obtaining adaptive diversity in a sectored cell.

As previously noted, we have discovered a manner and means of overcoming the shortcomings of the previously described arrangements. The exemplary embodiment of FIG. 5 is an arrangement for obtaining effective diversity with only one antenna in each sector of a sectored cell and with adaptive diversity obtained through the use of structure which dynamically adapts to changing signal conditions due to movement of the mobile, as well as the effects of multipath fading.

The structure uses an analog comparator which obtains RSSI signals from two receivers, wherein the comparator output is connected to switch SW1 by way of a logical OR-like switching structure 11 which is symbolically shown. Such OR structure allows (under the control of logic element 9) a diversity operation between the output of receiver 1 and the output of receiver 2 or requires the audio output from receive 1 to be passed by way of switch SW1 to processor 5 for short periodic intervals. During the short periodic intervals, receiver 2 is used to measure the RSSI from the left and right adjacent sectors by using elements 9 and 10 to determine which adjacent sector is producing the strongest signal and, therefore, which sector antenna is to be connected to receiver 2.

The process may be understood by again considering the example illustrated in FIG. 2 where the mobile is located at M which is closer to sector RA than to sector LA. The signal in sector RA, accordingly, will be stronger than the signal sensed by antenna 6 in sector LA. If the location of the mobile unit were known in advance, the operation of the antenna switch ASW to select RA for connection to receiver 2 would be a foregone conclusion and easily implemented. Although such information is not available in advance, the invention takes advantage of two facts; namely, (a) that the location of the mobile unit within a cell changes relatively slowly compared to the rather rapid fluctuations of multipath fading, and (b) improvements in the recovered audio due to effective diversity is a statistical process which obtains improved quality of communications by reducing the *average* noise level in the recovered audio. As to the first noted fact, although multipath fading must be overcome by the rapid switching provided by a diversity system, since the *average* signal level changes slowly, it is possible to determine the average signal level by making less frequent measurements than is required for maintaining diversity.

We have discovered that effective diversity can be maintained for a large portion of the time, for example 90% of the time, and that the resulting improvement in quality is substantially equal to that obtained where diversity is maintained 100% of the time. We have further discovered that average adjacent sector signal levels may be obtained by taking periodic short samples of the RSSI in the adjacent sectors and that such samples provide a measure which indicates which adjacent sector has the strongest signal and, therefore, the position which should be assumed by switch ASW. Under such circumstances receiver 2 can be connected to the antenna of the adjacent sector with the strongest signal as well as the analog comparator and thereafter provide effective diversity between sector S and the strongest adjacent sector. As aforementioned, said diversity periods are relatively long, such as 90% of the period. During the short periodic samples when the relative signal strengths of the adjacent sectors is measured, logic element 9 by way of OR structure 11 forces switch SW1 to connect the receiver 1 audio to processor 5. Accordingly, during all portions of the period an audio signal is applied to the processor 5, albeit, without diversity during the short sampling or measuring periods. However, the worst that can happen during the short measuring period would be a deep fade in the signal from the antenna in the S sector, which, of course, could happen during the measurement process. Statistically, however, such deep fades occur much less than 50% of the time during multipath fading. As such the average signal strengths may be maintained at a high signal level, and consequently, the quality of communications is improved through the use of a relatively simple and inexpensive circuit design which is well suited for inclusion in a competitive commercial product.

The process of the exemplary embodiment of FIG. 5 may be more fully understood from a consideration of the timing diagrams illustrated in FIGS. 6A to 6D. FIG. 6A illustrates that diversity is effective, i.e., SW1 continually selects the strongest of the two receiver audio output signals, except when measurements are made during the relatively short sampling periods. As illustrated in FIG. 6B, during the relatively long diversity periods the switch SW1 may connect either of the receivers to the audio processor 5 but during the relatively short measuring periods only receiver 1 is connected to element 5. FIG. 6C indicates which antenna (6 or 8) is connected to the second receiver by way of switch ASW at any particular time. The particular antenna connected, of course, will depend upon the measured signal strength from the antennas which are sampled in the timed manner illustrated in FIG. 6D.

Considering the timing cycles of FIGS. 6A to 6D together at time T0 when diversity is active between sectors S and LA, sector RA and its antenna are inactive in the sense of not being connected to receiver 2. At time T1, although diversity is still active, the RSSI of the active sector LA is sampled and measured at the converter 10, and logic 9 then controls SW1 to select the audio from receiver 1 for transmission to processor 5. Simultaneously, the logic element 9 operates switch ASW to connect receiver 2 to the "inactive" RA sector and at time T2 the RSSI of sector RA is sampled and measured. The time difference between T1 and T2 is critical only to the extent of allowing sufficient time for the signal strength of receiver 2 to settle to its new value after the operation of the antenna switch ASW. A comparison is then made by logic element 9 to determine whether the signal strength of sector LA or RA is strongest, and the positioning of switch ASW is made in accordance with the determination. Thereafter, logic 9 allows switch SW1 to again operate in a diversity mode.

As illustrated in FIG. 6C, the right adjacent sector RA at time T2 would be determined to be larger than the left adjacent sector LA such that when diversity is reactivated, the active sector is changed from adjacent sector LA to adjacent RA. Additionally, in the period between T2 and T3, diversity is active between sector S and sector RA with LA "inactive". Moreover, as clearly illustrated in FIG. 6A, at the end of time T3 a new measurement cycle begins but with sector RA measured during the active diversity period and sector LA measured when SW1 is forced to connect receiver 1 to processor 5.

Accordingly, the exemplary embodiment of FIG. 5 provides a circuit design that not only provides high quality communications but provides such results with a design well suited to a competitive commercial product. Moreover, the problems of the prior art are avoided by dynamically adapting to changing signal conditions whereby effective diversity is obtained to combat the effects of multipath fading as well as changing signal conditions due to movement of the mobile unit. The latter condition is measured for the purpose of using the strongest sector signal as well as determining when cell-to-cell transfer or handoff should occur.

Figure 7:
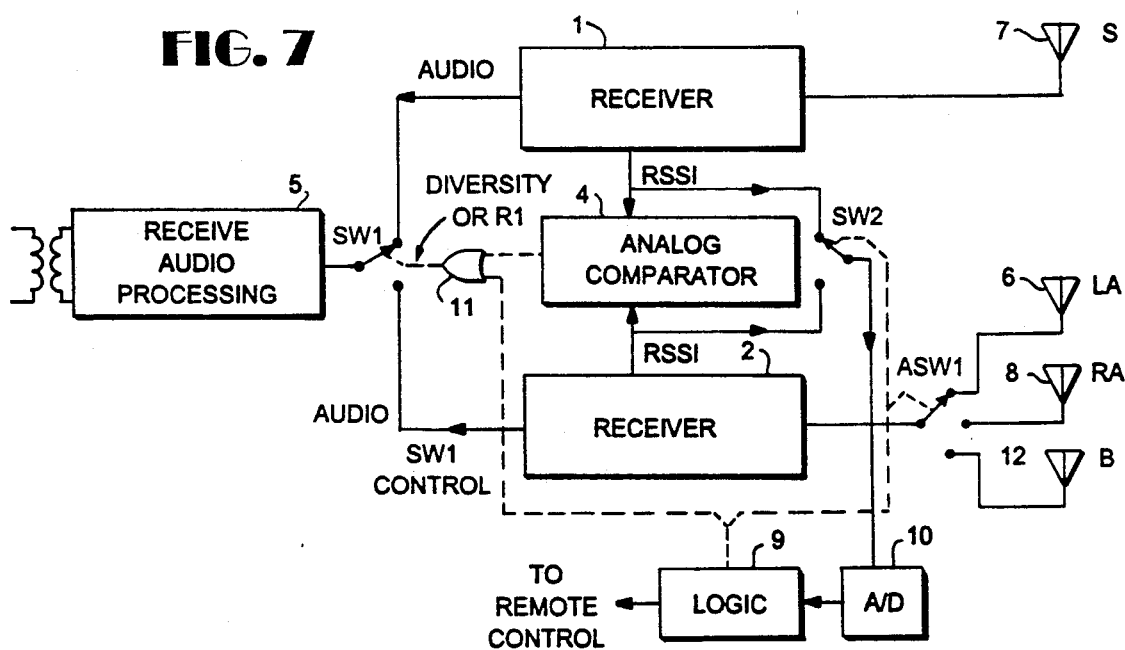
FIG. 7 is an exemplary embodiment similar to that which is found in FIG. 5 illustrating additional variations thereof.

FIG. 7 illustrates variations of the exemplary embodiment of FIG. 5. For example, the RSSI of sector S and receiver 1 may be measured and stored in logic 9, and the RSSI of additional sectors may also be measured during the periodic short samples of adjacent and other sectors, said other sectors being represented by sector B and antenna 12. The measuring of additional such signal strength samples may be used for storing average or rolling values or for comparison purposes with the RSSI of sector S along with other RSSI's for determining, among other things, the need for cell-to-cell transfer or handing off. Additionally, the inclusion of other sectors in the diversity may take into consideration the RSSI of the sector diametrically opposite from the S sector in order to handle the case where the mobile unit is passing substantially directly under the antenna tower through the center of the cell.

Still other variations will occur to those skilled in the art. For example, logic unit 9 may be advantageously designed to choose or base its decisions on more than one sample of RSSI from a particular sector. Such decisions may be based upon maintaining average readings of RSSI from each sector and updating the averages at each measurement cycle. The choice of which receiver to use when based upon such average signals is indicative of the position of the mobile unit and such averages would vary slowly.

Additionally, the artisan will recognize that the sequence in which the switches are operated and the measurements taken may be varied within the teachings of our disclosure. In FIGS. 6A to 6D, for example, the time during which diversity is active can be maximized by making the order in which the adjacent sectors are measured dependent upon which sector is currently active. Such an operation, however, is not necessary and the logic may be simplified by making the order fixed and extending the diversity inactive period to cover measurements of both adjacent sectors. Still further, the artisan will recognize that contemporary circuit elements may be used to implement the exemplary embodiments illustrated and described. For example, the switches such as SW1 could be implemented with commercially available solid state devices such as CMOS transmission gates. Additionally, the antenna switch ASW could also be a solid state device such as a pin diode RF switch. Still further, the logic element 9 could be easily implemented by way of programming conventional microprocessors.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An apparatus for obtaining adaptive diversity in a multipath communication system, said apparatus comprising:
   a plurality of directional signal detecting elements, each said element operable to detect signals propagating from a sector in a multisectored pattern;
   at least two receivers, each receiver connected to at least one signal detecting element and producing an output signal indicative of the received signal strength;
   logic means connected to said receivers and operable in a first mode for continuously determining which receiver output signal is indicative of the strongest received signal and connecting said strongest received signal for use in said communication system;
   said logic means operable in a second periodic mode to connect a particular one of said receivers for inputting its received signal to said communication system regardless of whether it is receiving said strongest signal,
   wherein said particular one of said receivers is connected to a single detecting element and another of said receivers is connected to at least two detecting elements, and
   wherein said logic means includes further means operable in said second mode for measuring the signals of a plurality of said detecting elements and for connecting the strongest of said signals to said another of said receivers.

2. An apparatus as specified in claims 1 wherein said logic means includes a comparator for continuously determining in said first mode which receiver output signal is indicative of the strongest received signal.

3. An apparatus as specified in claim 1 wherein said detecting elements are directional antenna means and said at least two detecting elements detect signals propagating from sectors adjacent the sector in which said single detecting element is operable.

4. An apparatus as specified in claim 3 wherein said communication system is a cellular mobile telephone system which includes a signal processor and the signals connected thereto from the receivers are audio signals.

5. An apparatus as in claim 4 where the logic means include analog to digital converter means and said logic means measures the received signal strength of said particular one of said receivers when in said first mode.

6. An apparatus as specified in claim 5 wherein the values of received signal strength measured by said logic means when in said first and second modes are used to determine when it is necessary to transfer communications to another cell.

7. An apparatus as specified in claim 6 wherein the first and second modes of operation occur for predetermined time periods and the time period for said first mode is substantially longer than that of said second mode.

8. An adaptive diversity apparatus for use with a signal processing element of a cellular telephone system, said apparatus comprising:
   a plurality of directional antennas, each antenna operable to detect signals propagating from a sector of a multisectored cell;
   a plurality of groups of receivers, each group including at least two receivers each of which receives signals from at least one of said antennas;
   signal comparator means connected to each of said groups to determine which of said at least two receivers is producing the strongest output signal;
   a switch element in each said group operable in a first mode and responsive to said comparator for connecting the receiver with the strongest output signal to said signal processing element;
   logical processing means for periodically causing said switch element to operate in a second mode to connect a particular one of said receiver output signals of a group to said signal processing element for a predetermined time period whether or not the output signal of said particular one receiver is the strongest of said output signals.

9. An apparatus as specified in claim 8 wherein during the periodic connection of said particular one receiver to the signal processing element said logical processing means measures the received signal strength for each antenna connected to another receiver of each group and then connects the antenna having the largest signal strength to said another receiver for the subsequent first mode operation.

10. An apparatus as specified in claim 9 wherein the first mode occurs for a predetermined period of time and the time period for said second mode is substantially shorter than that of said first mode.

11. The apparatus as specified in claim 9 wherein the antenna connected to said one particular receiver of a group is for a particular sector and the antennas connected to said another receiver are adjacent sectors.

12. The apparatus of claim 9 wherein the logical processing means measures the received signal strength of said particular one of said receivers when in the first mode.

13. An apparatus as specified in claim 12 wherein the values of received signal strength measured by said logical processing means when in said first and second modes are used to determine when it is necessary to transfer communications to another cell.

14. A method of obtaining adaptive diversity in a multipath communications system, said method comprising:
 arranging plural signal detectors to detect signals propagating from a multisectored pattern where each detector is operable to detect signals coming from a sector;
 connecting first signal receivers to ones of said detectors;
 connecting second signal receivers to receive signals from a plurality of other ones of said detectors;
 comparing in a first mode of operation the received signal strengths of said first receivers with the received signal strengths of said second receivers and connecting the signals from the receivers having the strongest received signal strengths to said communications system;
 comparing in a second periodic mode of operation the received signal strengths from each of said other ones of said detectors whereby the detectors providing the strongest signals are connected to said second receivers; and
 connecting the signals from said first receivers to said communication system when in said second mode irrespective of the signals strengths of said receivers.

15. The method as specified in claim 14 wherein said other ones of said detectors are arranged to detect signals from sectors adjacent to the sectors containing said ones of said detectors.

16. The method of claim 14 further comprising the steps of:
 measuring the received signal strengths of said first detectors in said first mode;
 measuring the received signal strengths of said other ones of said detectors in said second mode; and
 utilizing said measured signal strengths to determine when it is necessary to transfer communications to another multisectored pattern.

17. The method as specified in claim 14 further comprising the step of:
 controlling the first and second modes to periodically occur for first and second periods of time, respectively, and wherein said second period of time is substantially shorter than said first period of time.

18. The method of claim 14 wherein the communication system is a cellular mobile telephone system and said detectors are directional antennas for producing audio signals at the outputs of said receivers.

* * * * *